US006775788B1

United States Patent
McCarthy et al.

(10) Patent No.: US 6,775,788 B1
(45) Date of Patent: Aug. 10, 2004

(54) METHOD FOR PROVIDING A SYNCHRONOUS COMMUNICATION AND TRANSACTION BETWEEN FUNCTIONS ON AN INTEGRATED CIRCUIT THEREFORE THE FUNCTIONS OPERATE INDEPENDENTLY AT THEIR OWN OPTIMIZED SPEEDS

(75) Inventors: Dominic Paul McCarthy, Los Altos, CA (US); Jack Choquette, Mountain View, CA (US)

(73) Assignee: Raza Microelectronics, Inc., San Jose, CA (US)

( * ) Notice: Subject to any disclaimer, the term of this patent is extended or adjusted under 35 U.S.C. 154(b) by 485 days.

(21) Appl. No.: 09/654,717

(22) Filed: Sep. 5, 2000

(51) Int. Cl.[7] .......................... G06F 13/42; G06F 15/00; G08C 15/00
(52) U.S. Cl. .......................... 713/400; 712/25; 370/231
(58) Field of Search .......................... 713/400; 712/25; 370/231

(56) References Cited

U.S. PATENT DOCUMENTS 6,145,073 A * 11/2000 Cismas ........................ 712/25

6,243,612 B1 * 6/2001 Rippenhagen et al. ...... 700/100
6,330,225 B1 * 12/2001 Weber et al. ................ 370/231

FOREIGN PATENT DOCUMENTS

JP          04035248 A  *  2/1992  .......... H04L/12/40

OTHER PUBLICATIONS

Bill Cordan, An Efficient Bus Architecture for System–On–Chip Design, 1999 IEEE, pp. 623–626.*

* cited by examiner

Primary Examiner—Dennis M. Butler
Assistant Examiner—Suresh K Suryawanshi
(74) Attorney, Agent, or Firm—Fernandez & Assoc

(57) ABSTRACT

The invention relates to the field of system on a chip, SoC, information processing architecture and particularly to the use of a homogenous, concurrent-communication interconnection architecture that allows a variety of different functions to be connected together and their full synergistic performance realized. The functions are decoupled from each other, allowing performance optimization of each function without regard for the other functions on the chip. The system data flow is coordinated using a overall system schedule allowing data interactions to be orchestrated efficiently.

12 Claims, 2 Drawing Sheets

METHOD FOR PROVIDING A SYNCHRONOUS COMMUNICATION AND TRANSACTION BETWEEN FUNCTIONS ON AN INTEGRATED CIRCUIT THEREFORE THE FUNCTIONS OPERATE INDEPENDENTLY AT THEIR OWN OPTIMIZED SPEEDS

FIELD OF THE INVENTION

The invention relates to processing information architecture on an integrated circuit, particularly processing system scheduling and function decoupling architecture for system-on-a-chip (SoC).

BACKGROUND OF THE INVENTION

The ability to reduce the physical size of the various ICs has led to more combinations of functions on a single chip. Thus, wherein functions previously provided as a combination of several integrated circuits, delineated by functional and physical boundaries such as that provided of a microprocessor chip, a memory controller chip, and a memory chip, are now converging onto a single chip solution (also referred to as a system-on-a-chip (SoC)).

To facilitate the combination of different functions on a single chip, common methods of communication architectures are used. Most SoC functions are currently coupled together using on-chip busses. On-chip busses are standardized bus structures provided as the expected common interface for each functional on-chip component. These busses have several drawbacks limiting the efficiency of the overall design for the following reasons such as: 1) providing only one communication path to be established at any one time causing bus contention; 2) requiring use of standard read and write protocols and bus arbitration to establish system communication, without a scheduling technique for directing communication traffic thereby resulting in overheads and latency to gain bus accesses and arbitrate the busses.

Many of the components integrated on a chip today are modeled on their discrete counterparts, and not integrated as a single chip. Thus, they are inherently unable to exploit the SoC environment. The resulting architecture is neither scalable nor can it be easily optimized for a particular application. Accordingly, it is desirable to have a high performance, homogenous, scalable method and system for managing communication within an SoC architecture that allows a variety of different functions to be brought together and their full synergistic performance realized by decoupling the functions (isolated from other functions within the chip), and providing an efficient system scheduling for data flow around the chip.

SUMMARY OF THE INVENTION

A high performance method and system for processing information on an integrated circuit, also referred herein as a SoC processing method and system, is provided by decoupling the various on-chip functions, such as memory, I/O interface, multi-media applications co-processors, etc., while also providing communication means between these functions.

The high performance SoC processing method and system comprises decoupling a microprocessor core into discrete functional components such as, for example, a segregated centralized debug unit, a floating-point vector processor, and an integer vector processor. Each discrete functional component, also referred herein as intellectual property (IP) engines, is individually isolated from each other functional processing IP engine to allow functional component performance optimization within the SoC processing system. A limbic processor is also provided that comprises a common system scheduler to coordinate the data flow around the SoC processing system. Each isolated SoC function can then operate at higher performance and frequencies, independent of the system clock speeds.

DETAILED DESCRIPTION OF AN INVENTION

Figure 1:
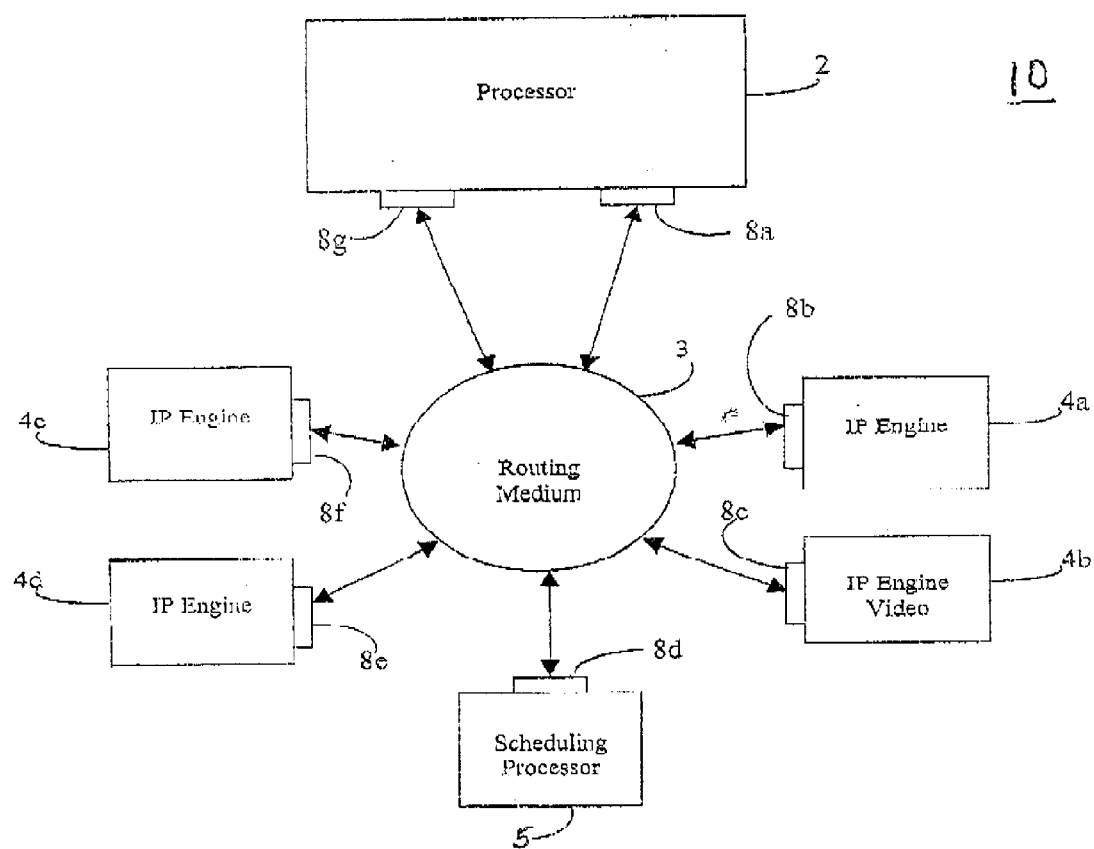
FIG. 1 illustrates a simplified block diagram of a high performance system for processing information on an integrated circuit in accordance with the principles of this invention.

FIG. 1 shows a high performance SoC processing architecture 10 that comprises, among others, for example, a decoupled microprocessor core 2, a segregated centralized debug unit (IP Engine) 4a, a floating-point vector processor (IP Engine) 4b, and an integer vector processor (IP Engine) 4c. Each discrete functional component, also referred herein as intellectual property (IP) engines 4a–4d, being individually isolated from each other functional processing IP engine to allow functional component performance optimization within the SoC processing system 10. A scheduling processor 5 is also provided to coordinate the data flow around the SoC processing system 10. A system interconnect component or routing medium 3, provides channels for high performance communication between components and enables each isolated SoC function to operate at higher performance and frequencies, independent of other component clock speeds.

Key benefits being:

(i) an interconnection architecture designed to provide a unified homogenous structure that can support multiple concurrent communication channels providing a generic interface to a variety of IP components;

(ii) a simple generic transaction protocol that enables components within a system to interact at extremely high speed;

(iii) synchronization signaling between functions to allow each function to operate independently and yet be able to coordinate with the system;

(iv) decoupling of functions to allow each function to be optimized without regard to the rest of the functions on the chip allowing the functions to be optimized for performance independently of the other functions on the IC;

(v) system schedules orchestrated by a scheduling controller to schedule the interactions of the components in a predictable way so that the performance is maximized for the whole system.

Interconnection Infrastructure

In the preferred embodiment the invention is designed as a complete interactive system on a single chip. Unlike a bus system, the invention provides a homogenous interconnection structure. The invention architecture has four basic objectives to provide:

(i) A transaction protocol to provide a common communication language between different functions on the chip. It enables components within a system to interact. It can also support centralized system debugging capabilities.

(ii) A routing medium providing the means for the transactions to be routed between components.

(iii) An interpretive and synchronizing connection interface providing a unidirectional communication connection between the medium and the functions.

(iv) system scheduling orchestrated by an independent scheduling processor using the transaction protocol.

Transaction Protocol

The Transaction protocol is independent of the routing medium and may be used with a standard bus although not as efficiently. The protocol provides for unidirectional write-only transactions allowing for read transactions using two writes (the first write transaction is a 'request-for-write' to a component; the second is a write transaction from the second component to the first), synchronization mechanisms, and low overhead so that mapping onto the connection interface is simple.

The Routing Medium and Connection Interface

Transactions transmitted between components, travel over a routing medium. The routing medium is similar to a bus except that each component is connected to the medium through a lightweight interpretive and synchronizing connection interface. The interface has separate unidirectional interfaces for input and output transactions allowing simultaneous input and output data transfers, synchronization with the IP component clock and the routing medium clock. It is also allows for scalability to accommodate component bandwidth requirements and data field sizes. In essence, the interface is a component interpreter taking individual component communication, translating that to usable transactions, and completely isolating the component from the arbitration and routing of transactions over the medium.

System Scheduling

A scheduling processor 5 is provided in the SoC system 10 that is independently responsible for issuing transactions to all SoC functional components, such as IP components 4a–4d in system 10, and for routing data flow around system 10. Scheduling processor 5 need not necessarily be an on-chip processor but may in fact be a completely independent and external, or a function within another component such as the microprocessor 2.

By using synchronization transaction primitives, scheduling processor 5 can construct pipelined sequences involving many components and coordinate the data flows using synchronization boundaries. Thus, increasing data flow efficiencies.

Processor Core

As illustrated by FIG. 1 SoC system 10 comprises a core processor 2, a interconnect routing medium (also referred herein as a cortex) 3 to allow for concurrent transactions throughout system 10, one or more IP functions 4a–4d, an interpretive and synchronizing connection interface 8(a–h) used to couple routing medium 3 to processor core 2 and IP functions 4a–4d, and a scheduling processor 5 coupled to SoC system 10 through its own synaptic interface 8d to schedule the transactions and orchestrate the entire data flow around the SoC system 10.

Processor core 2 is coupled to the routing medium 3 through the connection interface 8a–8g. Synaptic interfaces 8a–8h allow the decoupling of processor 2 from the routing medium 3 while also providing synchronization of the overall SoC system 10, thereby providing optimum performance. To optimize processor 2 functions, the scheduling processor 5 orchestrates higher-level data flow round the chip.

The embodiment of this SoC has one or more IP functions 4a–4d integrated into chip 10. Each of these functions 4a–4d provide specific applications. Functions 4a–4d can be components designed by other firms optimized for a particular function and then integrated using this new interconnect architecture 10. Each of functions 4a–4d is coupled to the routing medium 3 via a synaptic interface 8, such as connection interface 8a–8j, but each individual interface 8 is designed to interact with individual IP components 4a–4d 2a–2h. This allows each IP function component to be optimized without regard to the rest of the IP functions. The connection interfaces are preferably closely coupled to its associated respective function 4a, 4d, etc.

Figure 2:
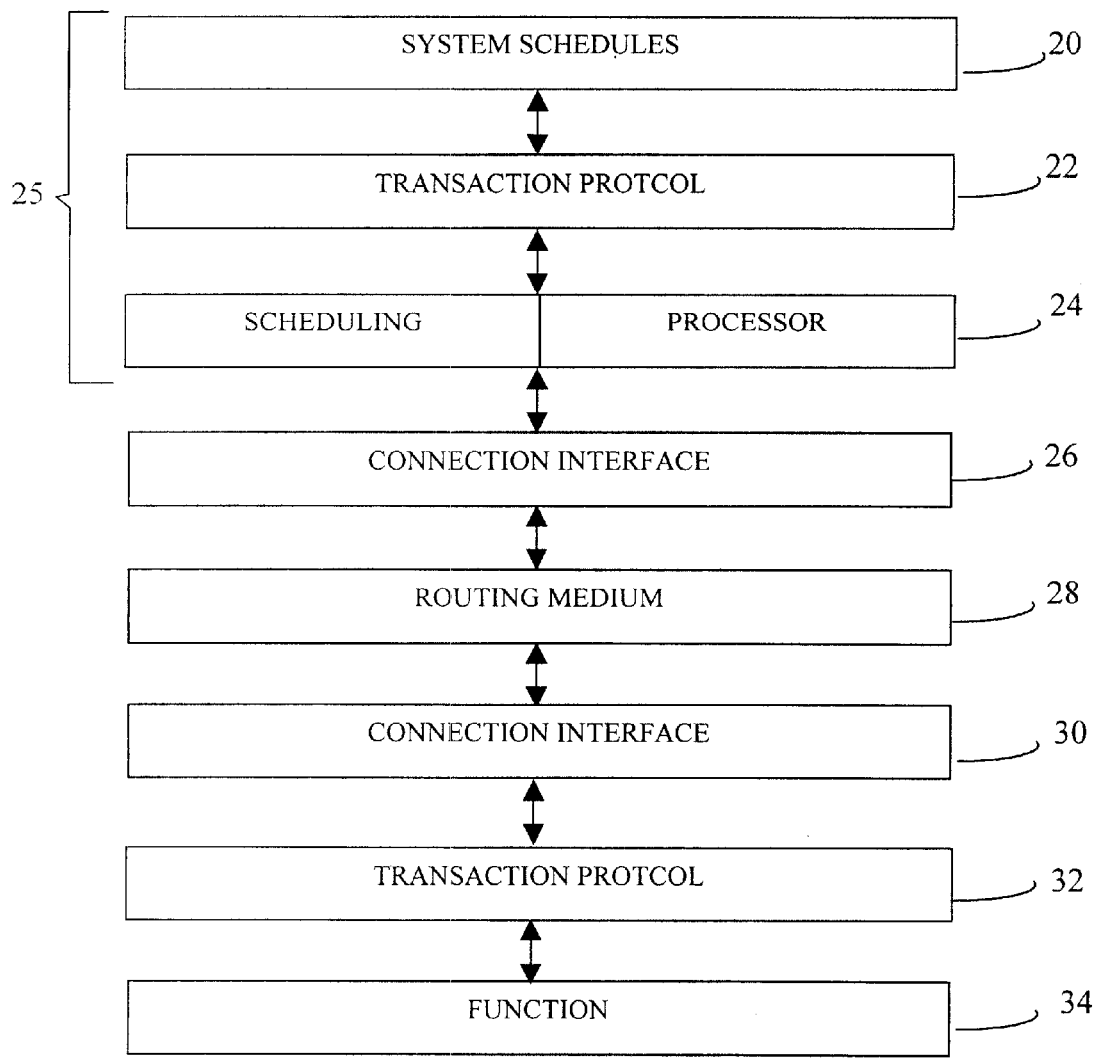
FIG. 2 illustrate a simplified flow chart of a method of processing information on the high performance system of FIG. 1.

FIG. 2 illustrates the overall method and data flow process for SoC system 10 of FIG. 1. SoC scheduling process comprises a system schedule 20, a transaction protocol 22, and a scheduling processor 24 as part of the execution layer 25. At the execution layer 25, data flow is scheduled, translated into generic transaction protocols 22, and then is mapped onto the Connection Interface 26 for transmission across the Routing Medium 28.

After the data has crossed the Routing Medium 28 it is then intercepted by the Connection Interface, interpreted into Component-Specific Transactions 32 synchronized with the system, and then delivered to the function 34. In this process, data is moved in a orderly fashion, the individual functions are decoupled from the other system components, and transactions are synchronized allowing the SoC to be fully optimized.

The above embodiments are only illustrative of the principles of this invention and are not intended to limit the invention to the particular embodiments described. For example, one skilled in the art should recognize that the number of IP functions is purely design dependent upon the overall functionality of the SoC, the scheduling function could be incorporated into the processor core but would probably make the system less efficient and that other types of transactions could be written that would perform similar functions.

Accordingly, various modifications, adaptations, and combinations of various features of the described embodiments can be practiced without departing from the scope of the invention as set forth in the appended claims.

We claim:

1. A method for processing information between integrated functions on a integrated circuit, comprising the steps of:

providing an interconnection routing medium comprising a plurality of communication channels therebetween the functions;

providing a connection end on each end of the channels;

providing a transaction protocol between the functions to allow the functions to exchange information;

synchronizing the functions to allow the functions to interact in a synchronized way; and decoupling the functions from the routing medium to allow for independent operation and speed optimization.

2. The method of claim 1 wherein:

the routing medium comprises an interpretive-synchronization interface on each end of the connections, wherein one of the interfaces between the routing medium and the function coupling the routing medium to the function, and another of the interfaces between a core processor and the routing medium coupling the core processor to the routing medium.

3. The method of claim 1 wherein:
the transaction protocol comprises the steps of providing unidirectional-only access between functions.

4. A method for processing information between integrated functions on an integrated circuit, comprising the steps of:
providing an interconnection routing medium comprising a plurality of communication channels therebetween the functions;
providing a connection end on each end of the channels;
providing a transaction protocol between functions to allow the functions to exchange information;
synchronizing the functions to allow the functions to interact in a synchronized way; and
scheduling system transactions by providing a system schedule protocol enabled by an independent system schedule processor to manage data flow around the integrated circuit.

5. The method of claim 4 wherein:
the routing medium comprises an interpretive-synchronization interface on each end of the connections, wherein one of the interfaces between the routing medium and the function coupling the routing medium to the function, and another of the interfaces between a core processor and the routing medium coupling the core processor to the routing medium.

6. The method of claim 4 wherein the transaction protocol comprises the steps of: providing unidirectional-only access between functions.

7. A method for processing information on an integrated circuit, comprising the steps of:
providing an interconnection routing medium comprising a plurality of communication channels therebetween the functions;
providing a connection end on each end of the channels;
providing a transaction protocol between functions to allow the functions to exchange information;
synchronizing the functions to allow the functions to interact in a synchronized way;
decoupling the integrated functions from the routing medium to allow for independent operation and speed optimization; and
scheduling system transactions by providing a system schedule protocol enabled by an system schedule processor to manage data flow around the integrated circuit.

8. The method of claim 7 wherein the routing medium comprises an interpretive-synchronization interface on each end of the connections; both of the interfaces therebetween the routing medium and a function coupling the routing medium to the function.

9. The method of claim 7 wherein the transaction protocol comprises the steps of:
providing unidirectional-only access between functions.

10. A system for processing information on an integrated circuit, comprising:
an interconnection routing medium comprising a plurality of communication channels connecting a core to a plurality of functions;
a connection end on each end of the channels;
a transaction protocol means between the functions to allow the functions to exchange information;
synchronizing means between the functions to allow the functions to interact in a synchronized way; and
a decoupling means coupled therebetween the functions and the routing medium, to allow for independent operation and speed optimization of the functions.

11. The system of claim 10 wherein the routing medium comprises an interpretive-synchronization interface on each end of the connections; both of the interfaces therebetween the routing medium and the function coupling the routing medium to the function.

12. The system of claim 7 wherein the transaction protocol comprises the steps of: providing unidirectional-only access between functions.

* * * * *